United States Patent
Kadono et al.

[11] Patent Number: 5,756,201
[45] Date of Patent: May 26, 1998

[54] MAGNETIC THIN FILM FOR MAGNETIC HEAD, METHOD OF MANUFACTURING THE SAME, AND MAGNETIC HEAD

[75] Inventors: Masaru Kadono, Nara; Toshiyuki Fujine, Tochigi, both of Japan

[73] Assignee: Sharp Kabushiki Kaisha, Osaka, Japan

[21] Appl. No.: 629,844

[22] Filed: Apr. 10, 1996

[30] Foreign Application Priority Data

| Apr. 10, 1995 | [JP] | Japan | 7-083714 |
| Jul. 21, 1995 | [JP] | Japan | 7-185654 |
| Mar. 25, 1996 | [JP] | Japan | 8-067998 |

[51] Int. Cl.$^6$ ............................................ G11B 5/66
[52] U.S. Cl. ............... 428/332; 428/336; 428/694; 428/694 T; 428/694 TS; 428/694 TM; 428/694 R; 428/900; 427/127; 427/128; 427/131; 360/120; 360/126; 324/252
[58] Field of Search ............... 360/120; 324/126, 324/252; 428/694 T, 694 TS, 694 TM, 694 R, 693, 900, 332, 336; 427/127, 128, 131

[56] References Cited

U.S. PATENT DOCUMENTS

| 5,038,242 | 8/1991 | Fukushima | 360/120 |
| 5,549,978 | 8/1996 | Iwosaki | 428/692 |

FOREIGN PATENT DOCUMENTS

| 0415155 | 3/1991 | European Pat. Off. . |
| 0585930 | 3/1994 | European Pat. Off. . |
| 0606750 | 7/1994 | European Pat. Off. . |
| 3537110 | 4/1987 | Germany . |
| 1-279742 | 11/1989 | Japan . |
| 2-173914 | 7/1990 | Japan . |
| 2-203407 | 8/1990 | Japan . |
| 5-128434 | 5/1993 | Japan . |
| 6-053038 | 2/1994 | Japan . |
| 6-53038 | 2/1994 | Japan . |
| 6-180812 | 6/1994 | Japan . |
| 6-244048 | 9/1994 | Japan . |

OTHER PUBLICATIONS

Patent Abstracts of Japan, vol. 14, No. 498 (Oct. 30, 1990).
Patent Abstracts of Japan, vol. 17, No. 16 (Jan. 12, 1993).
Patent Abstracts of Japan, vol. 18, No. 522 (Sep. 30, 1994).
IBM Technical Disclosure Bulletin, vol. 22, No. 5, (Oct. 1979).
Patent Abstracts of Japan, vol. 14, No. 47 (Jan. 29, 1990).
Effects of Underlayers of Magnetic Properties of Fe–Al–Si Alloys Films, A. Murata et al, (1) p. # 151.
Structure and Magnetic Properties of Sendust/Under–Layer Films, A. Ashida et al, 13, 277–280 (1989), pp. 277–280.
Correlation Between Magnetic Properties of Deposited FeAlSi Films and Characterized of Laminated Heads, T. Fujine et al, pp. 313 and 151.

*Primary Examiner*—Leszek Kiliman
*Attorney, Agent, or Firm*—Birch, Stewart, Kolasch & Birch, LLP

[57] ABSTRACT

A magnetic thin film for a magnetic head includes an iron film layer formed on a substrate and including N chemically not combined with Fe, and a sendust film layer formed on the iron film layer and having a (111) plane orientation.

12 Claims, 8 Drawing Sheets

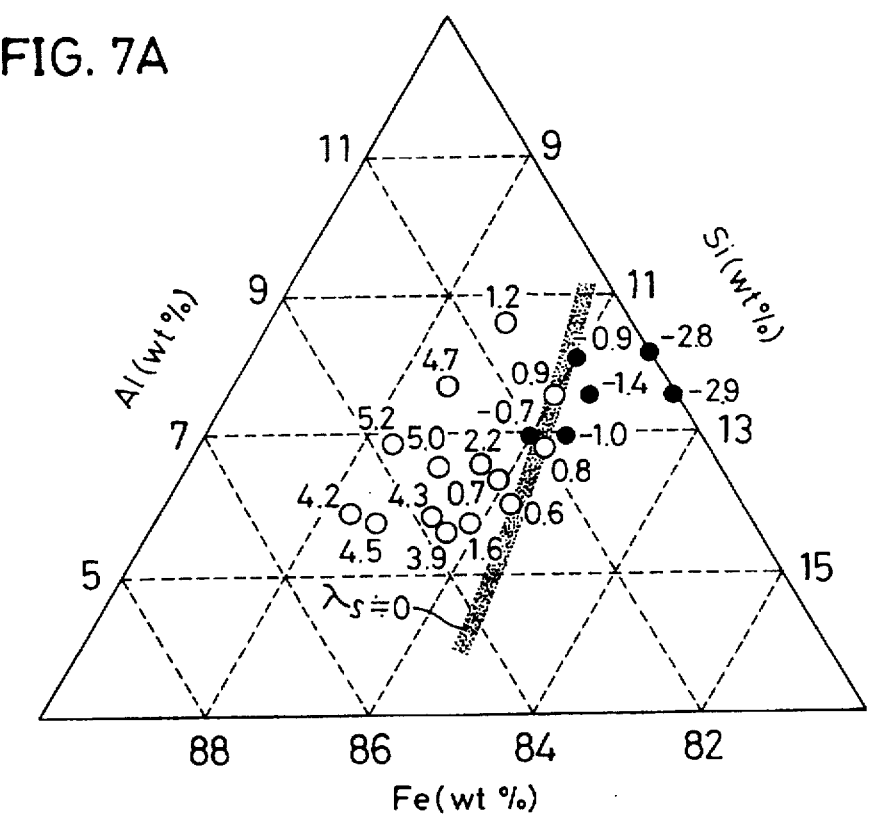

MAGNETIC THIN FILM FOR MAGNETIC HEAD, METHOD OF MANUFACTURING THE SAME, AND MAGNETIC HEAD

BACKGROUND OF THE INVENTION

1. Field of the Invention

The present invention relates to magnetic thin films for use in a magnetic head, and more particularly, to a sendust (Fe—Si—Al alloy) magnetic thin film deposited on an iron thin film underlayer, a method of manufacturing the same, and a magnetic head using the magnetic thin film.

2. Description of the Related Art

A magnetic recording head used in relation with a magnetic recording medium having a high coercive force must have a high saturation magnetic flux density in general. In order to attain a sufficient reproducing efficiency, a magnetic reproducing head desirably has a high magnetic permeability at a high frequency. In a conventional film deposition method such as sputtering, a magnetic thin film of sendust or the like is directly formed on a substrate. However, when the sendust film is directly formed on the substrate, frequency characteristics with a sufficient magnetic permeability cannot be obtained. This is conceivably due to a stress caused by the difference in coefficient of thermal expansion between the substrate and the magnetic film of different materials, the deposition process of the magnetic film affected by the substrate of the different material, and diffusion produced between the substrate material and the magnetic film material.

As a solution of this problem, known is a method of forming a sendust oxide film or a sendust nitride film as an underlayer before deposition of a sendust film, and a method of depositing a sendust film after formation of a sendust oxide film or a sendust nitride film on a substrate by oxidizing or nitriding sendust at the initial deposition stage of the sendust film (cf. Japanese Patent Laying-Open Nos. 2-203407, 6-180812, and 6-244048).

In addition to the above methods, a method has also been developed of forming an underlayer of a material other than sendust oxide or sendust nitride before deposition of a sendust film. For example, Japanese Patent Laying-Open Nos. 1-279742 and 5-128434 disclose an underlayer of chromium (Cr), and Japanese Patent Laying-Open No. 2-173914 discloses an underlayer of titanium (Ti) or ruthenium (Ru). Further, Murata et al. have reported an underlayer of Fe, Ti, Cr, Al or the like in their article entitled "Effects of Underlayers on Magnetic Properties of Fe—Al—Si Alloy Films", Meetings of the 12th Japan Society of Applied Magnetics, (1988, 1aD -4). Further, Ashida et al. have reported an underlayer of an Ni—Fe alloy in their article entitled "Structure and Magnetic Properties of Sendust/Under-Layer Films", Transactions of the Japan Society of Applied Magnetics, (Vol. 13, No. 2, 1989).

Japanese Patent Laying-Open No. 6-53038 describes that magnetic thin films including a iron microcrystals and sendust films are alternately stacked for orientation of the a iron microcrystals in a predetermined direction.

According to a report, when a sendust oxide film or a sendust nitride film is used as an underlayer, or when sendust is oxidized or nitrided at the initial deposition stage of a sendust film, a stress caused by the difference in thermal expansion between the substrate and the sendust film can be decreased, and the sendust film is oriented in parallel to a (220) plane based on the fact that the X-ray diffraction intensity corresponding to a close-packed crystal plane of the sendust film is increased. However, in the case of the sendust film having a close-packed (220) plane orientation, the film exhibits a columnar growth, and the density of the sendust film tends to be small at a boundary between columns in the vicinity of an interface between the substrate and the sendust film. Although an improvement in magnetic permeability is observed in a low-frequency region, the improvement is not significant in a high-frequency region. The sendust film having the (220) plane orientation cannot be used satisfactorily as a magnetic film for a magnetic head.

When a film formed only of iron is used as an underlayer, an effect of the sendust film being oriented in parallel to a close-packed plane (220) of a BCC (Body-Centered Cubic) structure. When the sendust film is formed on the iron film that has a low resistivity and a large crystal grain size, the magnetic permeability characteristics are hardly improved as compared to the conventional formation of the sendust film directly on the substrate.

When an Ni—Fe alloy is used as an underlayer, the sendust film has a problem in terms of heat resistance. Further, since the sendust film deposited on the underlayer has a (121) plane orientation, the frequency characteristics of the magnetic permeability are not improved at all.

In the case of a head using only a magnetic thin film as a magnetic head core, it is generally difficult to use a substrate having a large coefficient of thermal expansion stably. Therefore, such a head often uses a substrate having a smaller coefficient of thermal expansion than sendust. In such a case, the reproducing output could be improved with negative magnetostriction of sendust, which is disclosed by Fujine et al., "Correlation Between Magnetic Properties of Deposited FeAlSi Films and Characteristics of Laminated Heads," Meetings of the 18th Japan Society of Applied Magnetics, (1994, 14aF -2). However, it is not easy to obtain a film having a high magnetic permeability in a region of the negative magnetostriction of the sendust film because of a narrow alloy composition region having a high magnetic permeability.

SUMMARY OF THE INVENTION

One object of the present invention is to provide a magnetic thin film for a magnetic head including a sendust layer improved in magnetic permeability characteristics in the entire range from a low-frequency region to a high-frequency region.

The magnetic thin film for a magnetic head according to one aspect of the present invention includes an iron film layer formed on a substrate and including N chemically not combined with Fe, and a sendust film layer formed on the iron film layer and having a (111) plane orientation.

A magnetic head having a magnetic head core formed only of a magnetic thin film according to another aspect of the present invention includes a substrate, an iron film layer formed on the substrate and including N chemically not combined with Fe, and a sendust film layer formed on the iron film layer and having a (111) plane orientation.

A method of manufacturing a magnetic thin film for a magnetic head according to still another aspect of the present invention includes the steps of forming an iron film layer including N chemically not combined with Fe on a substrate using plasma in nitrogen atmosphere in a film deposition apparatus, and then forming a sendust film layer having a (111) plane orientation on the iron film layer in vacuum in the same film deposition apparatus.

The foregoing and other objects, features, aspects and advantages of the present invention will become more

3

BRIEF DESCRIPTION OF THE DRAWINGS

FIGS. 7A and 7B are graphs showing composition dependencies of magnetostriction and magnetic permeability of a sendust film, respectively, in the case where an iron film underlayer is provided.

DESCRIPTION OF THE PREFERRED EMBODIMENTS

The inventors have found that an iron film including N chemically not combined with Fe is effective as an underlayer for depositing a sendust film, the resistivity, crystal grain size, and thickness of this iron film are important as underlayer characteristics, and that the film deposition rate has a large influence on the iron film characteristics.

If a sendust film is formed on an iron film formed on a substrate using plasma in nitrogen atmosphere and including N chemically not combined with Fe, the sendust film can have a (111) plane orientation. As compared with a case without an iron film underlayer including N chemically not combined with Fe, this sendust film can implement frequency characteristics of a high magnetic permeability in a wide range from a low-frequency region to a high-frequency region. Further, with the (111) plane orientation, the sendust film formed on the iron film including N chemically not combined with Fe can exhibit stable magnetic properties in a negative region of magnetostriction. Therefore, by using this soft magnetic sendust thin film, a magnetic head with improved performance can be fabricated.

Figure 1:
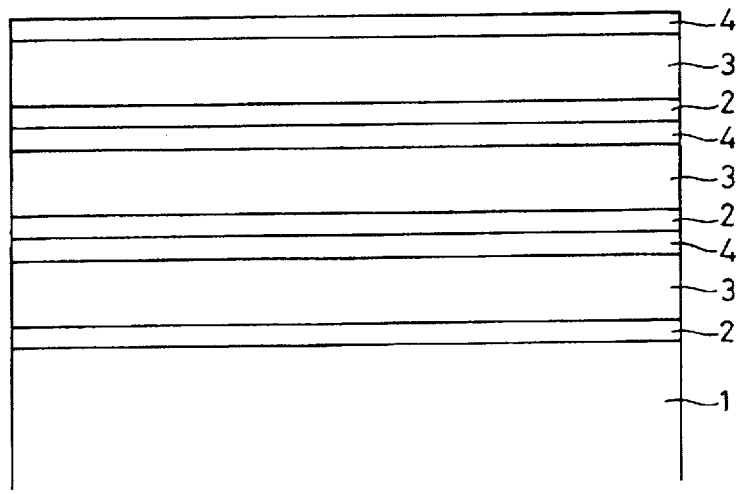
FIG. 1 is a sectional view schematically showing a magnetic thin film according to an embodiment of the present invention.

FIG. 1 is a sectional view schematically showing a magnetic thin film for a magnetic head according to one

4 embodiment of the present invention. The magnetic thin film of FIG. 1 includes a plurality of triple layers each formed of an iron film 2 formed on a ceramic substrate 1 in plasma in nitrogen atmosphere, a sendust film 3 formed in vacuum, and a protection film 4 of $SiO_2$. Note that the magnetic thin film may include a single triple layer. Any material other than ceramics can be used as substrate 1, as far as it has approximately the same coefficient of thermal expansion as sendust. For example, when it is intended to form a composite magnetic material with ferrite, ferrite is naturally used as the substrate. However, since it is not easy to use a substrate having a larger coefficient of thermal expansion than sendust stably in practice, the ceramic substrate having a little smaller coefficient of thermal expansion than sendust is preferably used.

Figure 2:
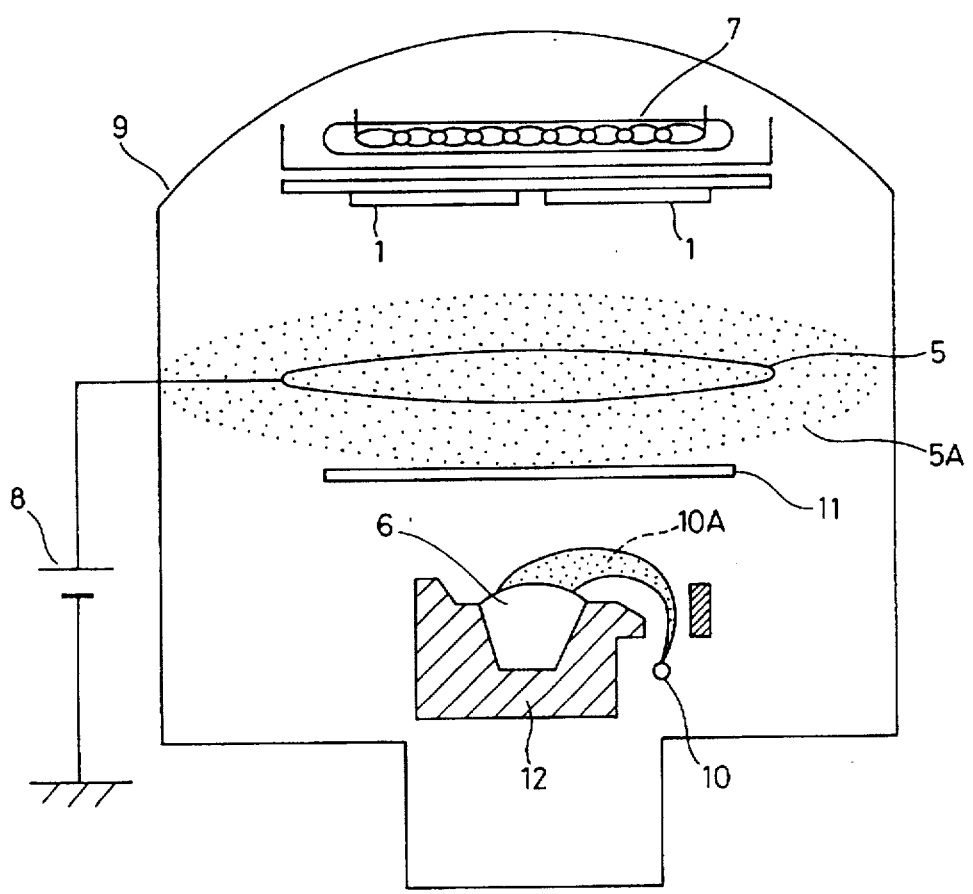
FIG. 2 is a sectional view schematically showing an evaporation apparatus for describing a method of manufacturing a magnetic thin film according to the present invention.

FIG. 2 is a sectional view schematically showing a film deposition apparatus for manufacturing such a magnetic thin film for a magnetic head as shown in FIG. 1. Referring to FIG. 2, substrate 1 of a material other than iron is set in an evaporation apparatus 9, and iron film 2 serving as an underlayer is first deposited by evaporation. At this time, substrate 1 is heated to a temperature within a range of 100° to 300° C. by a heater 7, and $N_2$ gas at approximately $2 \times 10^{-4}$ Torr is introduced into evaporation apparatus 9. Then, by heating a separately provided filament 10 to supply thermal electrons with a voltage being applied from a DC power source 8 to a copper coil 5 arranged in evaporation apparatus 9, plasma 5A is generated in the vicinity of coil 5. While plasma 5A is being generated, the DC voltage applied to coil 5 is approximately 50 V, and the current therethrough is approximately 100 mA. By directing electrons 10A emitted from filament 10 to an iron tablet (pure iron) 6 placed in a hearth 12 in this state, an iron film is formed on the surface of substrate 1. The film deposition rate at this time is set within a range of 20 to 350 nm/min, and the thickness of deposited iron film 2 is set within a range of 30 to 100 nm. Note that a shutter 11 in FIG. 2 is for controlling passage of an evaporated vapor flow.

Then, after evacuating evaporation apparatus 9 to approximately $2 \times 10^{-6}$ Torr or less to remove the $N_2$ gas, hearth 12 is exchanged to deposit sendust film 3 on iron film 2 by electron beam evaporation. At this time, a 4 wt % Al-27.5 wt % Si—Fe alloy is used as a sendust tablet, and the temperature of substrate 1 is set at approximately 250° C. The sendust film is deposited to approximately 4 μm in thickness at the rate of approximately 500 nm/min. Further, $SiO_2$ protection film 4 having a thickness of approximately 200 nm is formed on sendust film 3. Note that the sendust tablet does not necessarily match the deposited sendust film in composition. The composition of the sendust film to be deposited can be controlled within a certain range by adjustment of the film deposition condition. Therefore, even the sendust tablet of the above described composition can cover a composition region of a sendust film as shown in FIGS. 6A, 6B, 7A and 7B to be described later.

By conducting a vacuum thermal treatment at approximately 700° C. after stacking a plurality of triple layers each of iron film 2, sendust film 3, and $SiO_2$ film 4 obtained as described above, such a magnetic thin film for a magnetic head as shown in FIG. 1 can be obtained.

An analysis using X-ray diffraction has shown that iron films 2 of such a magnetic thin film for a magnetic head are roughly classified into three groups depending on the substrate temperature and the deposition rate at the time of film deposition.

Figure 3:
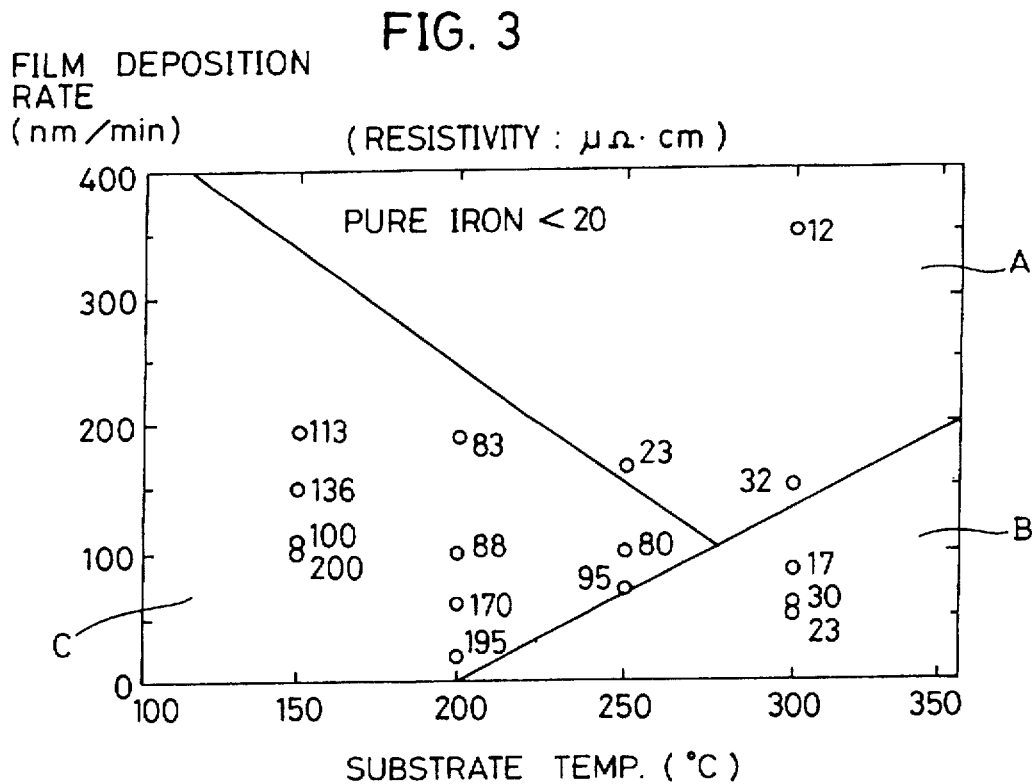
FIG. 3 is a graph showing the relationship between deposition condition and resistivity of an iron film.
Figure 4:
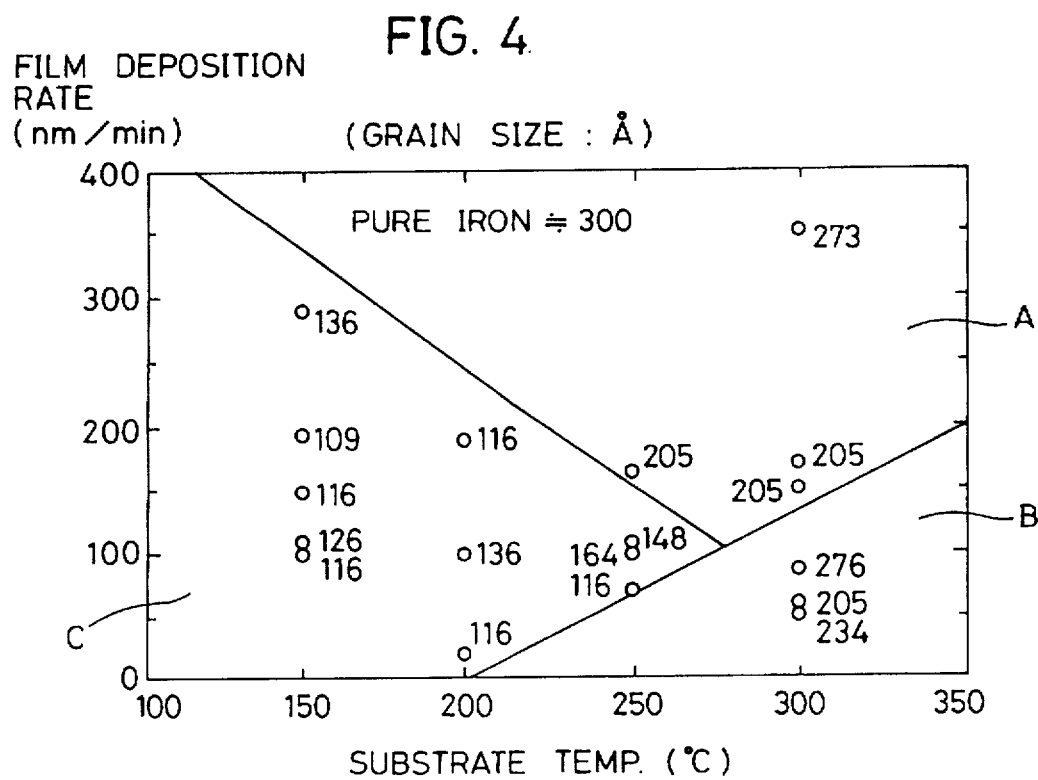
FIG. 4 is a graph showing the relationship between deposition condition and crystal grain size of the iron film.
Figure 5A:
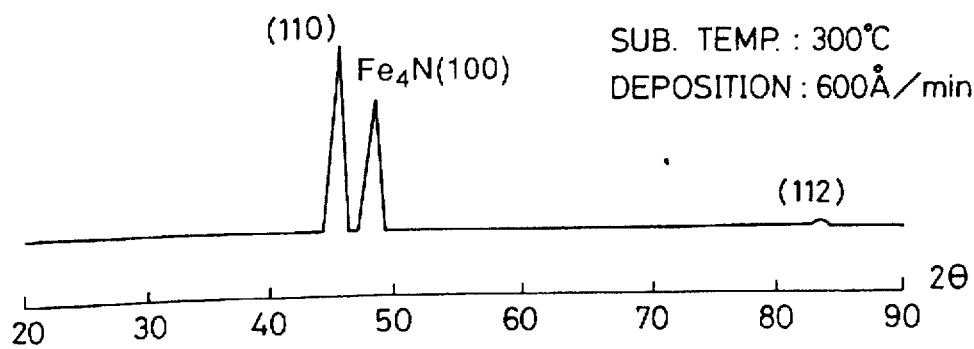
FIGS. 5A, 5B, and 5C are graphs showing X-ray diffraction data of the iron film obtained under various deposition conditions.
Figure 5B:
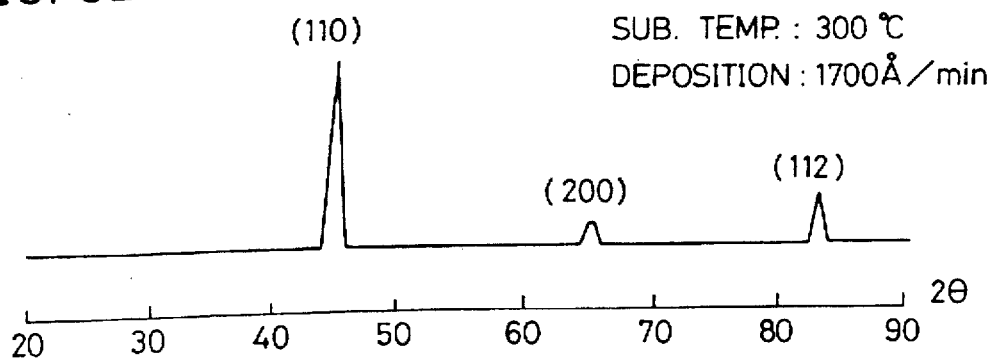
Figure 5C:
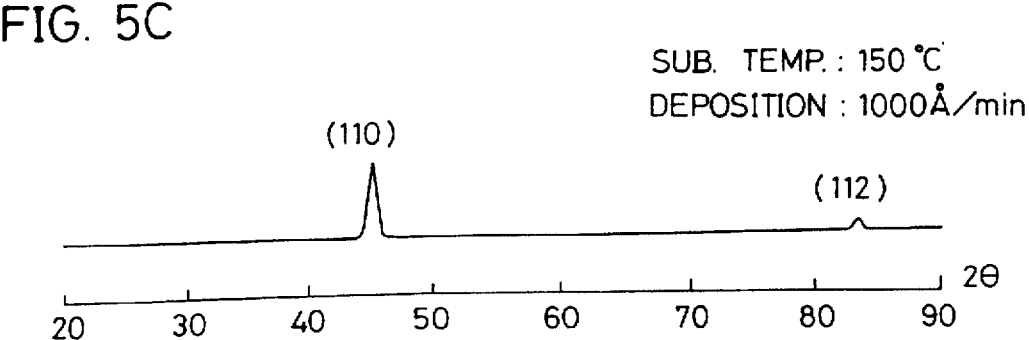

FIG. 3 shows the influence of the substrate temperature and the film deposition rate on the resistivity of iron film 2, and FIG. 4 shows the influence of the substrate temperature and the film deposition rate on the crystal grain size of iron film 2. More specifically, in each graph of FIGS. 3 and 4, the horizontal axis represents the substrate temperature (°C), and the vertical axis represents the film deposition rate (nm/min). Numerical values in the graph of FIG. 3 represent resistivities (μΩ·cm) of the iron film, while those in FIG. 4 represent grain sizes (Å) of the iron film. FIGS. 5A, 5B, and 5C show X-ray diffraction data relating to the iron film deposited under the conditions of various substrate temperatures and film deposition rates. In each of graphs of FIGS. 5A, 5B, and 5C, the horizontal axis θ represents Bragg angle (degree), and the vertical axis represents diffraction intensity (arbitrary unit). FIG. 5A shows X-ray diffraction data of the iron film deposited under the conditions of the substrate temperature of 300° C. and the film deposition rate of 600 Å/min. In FIG. 5B, the substrate temperature is 300° C., and the film deposition rate is 1700 Å/min. In FIG. 5C, the substrate temperature is 150° C., and the film deposition rate is 1000 Å/min.

As shown by solid boundaries in the graphs of FIGS. 3 and 4, the iron films deposited under the different substrate temperatures and film deposition rates are classified into three groups A, B, and C according to resistivity and grain size. The iron film classified into group A has an ordinary BCC structure, and shows a high X-ray diffraction intensity of a (110) plane as shown in FIG. 5A. As is seen from FIG. 3, in group A, the resistivity is at most approximately 30 μΩ·cm. The resistivity of 30 μΩ·cm or more cannot be obtained. As is clear from FIG. 4, the grain size obtained from a half-width of the X-ray diffraction peak is greater than 20 nm in group A. Further, as shown in FIG. 5A, the diffraction peak of $Fe_4N$ is also observed in group A.

The iron film classified into group B also has an ordinary BCC structure, and shows a high diffraction intensity of the (110) plane as shown in FIG. 5B. Further, as is clear from FIGS. 3 and 4, the resistivity is approximately 30 μΩ·cm or less, and the grain size is greater than 20 nm also in group B.

The iron films classified into groups A and B are not suitable for an underlayer of a magnetic film for a magnetic head.

On the other hand, although the iron film classified into group C has a BCC structure, it has a small grain size of approximately 20 nm or less and a large resistivity of approximately 50 μΩ·cm or more. We can guess that the upper limit of the resistivity of the iron film belonging to group C is approximately 300 μΩ·cm from FIG. 3, and that the lower limit of the grain size thereof is approximately 5 nm from FIG. 4. As shown in FIG. 5C, although the diffraction peak intensity of the (110) plane which is a close-packed plane of the BCC structure is low, and the peak of $Fe_4N$ is not detected in the iron film classified into group C, it is confirmed that nitrogen is included in the iron film based on the result of an X-ray fluorescence analysis. More specifically, it is recognized that the iron film of group C contains N chemically not combined with Fe. A sendust magnetic film for a magnetic head fabricated with the iron film of group C as an underlayer has extremely superior magnetic properties. More specifically, measurement under the condition of 500 Hz indicates that the coercive force without an underlayer is 40 A/m, while that with the iron film of group C as an underlayer is decreased to 30 A/m.

Figure 6A:
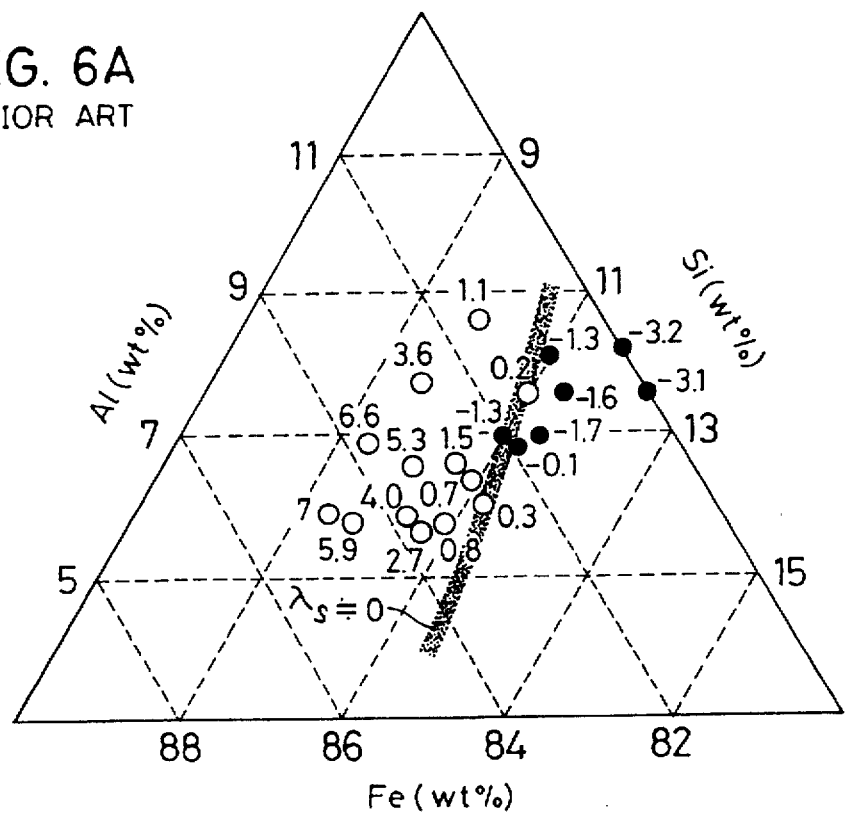
FIGS. 6A and 6B are graphs showing composition dependencies of magnetostriction and magnetic permeability of a sendust film, respectively, in the case where an iron film underlayer is not provided.
Figure 6B:
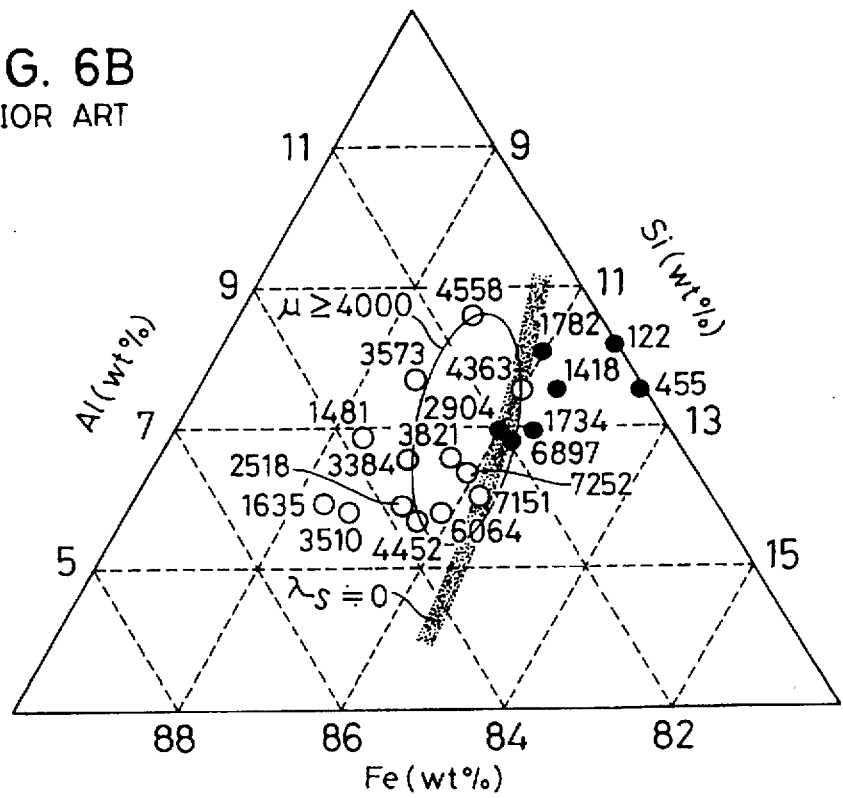

FIGS. 6A and 6B show changes of magnetostriction $λ_s$ and magnetic permeability μ when the composition of the sendust film is changed without an underlayer. Similarly, FIGS. 7A and 7B show changes of magnetostriction $λ_s$ and magnetic permeability μ when the composition of the sendust film is changed with the iron film of group C used as an underlayer. Referring to FIGS. 6A and 7A, numerical values at the composition positions indicated by hollow circles and solid circles represent magnetostriction $λ_s$ of a sendust film having positive magnetostriction and that having negative magnetostriction, respectively. On the other hand, referring to FIGS. 6B and 7B, numerical values at the composition positions indicated by hollow circles and solid circles represent magnetic permeability μ of a sendust film having positive magentostriction and that having negative magnetostriction, respectively. Further, in FIGS. 6A, 6B, 7A and 7B, the shaded line regions have magnetostriction $λ_s$ of approximately 0. In FIGS. 6B and 7B, the regions surrounded by solid curves have magnetic permeability μ of 4000 or more. As is clear from FIGS. 6B and 7B, the case with the iron film of group C as an underlayer has a wider region of high magnetic permeability μ (in FIGS. 6B and 7B, region having μ of 4000 or more, and which is on the right-hand side of the line of $λ_s$=0) than the case without an underlayer. In FIG. 7B, the region of $μ≧4000$ and $λ_s<0$ corresponds to a composition range of 85–86% Fe, 11–12% Si and 5.5–8.5% Al.

Figure 8:
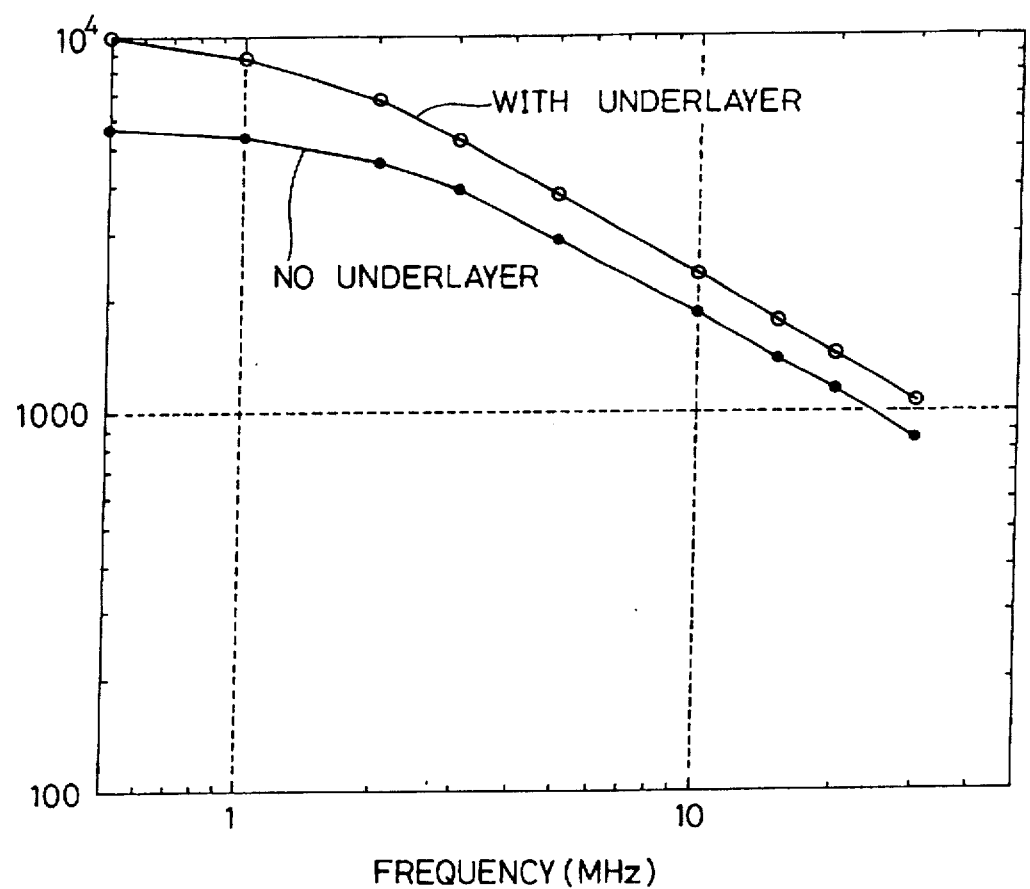
FIG. 8 is a graph showing the influence of the iron film underlayer on frequency dependency of magnetic permeability in a magnetic thin film.

FIG. 8 shows the relationship between frequency and effective magnetic permeability. In the graph of FIG. 8, the horizontal axis represents frequency (MHz) and the vertical axis represents effective magnetic permeability μ. Hollow circles in this graph represent the case with the iron film of group C as an underlayer, and solid circles represent the case without an underlayer. According to a comparison of measurement results of magnetic permeabilities of ring samples using an impedance analyzer, the magnetic permeability is approximately 6000 without an underlayer, and approximately 10000 with an underlayer, as is shown in FIG. 8. Although data of 7000 was available as general magnetic permeability characteristics of a sendust film having the (220) plane orientation, magnetic permeability data on the order of 10000 has not been available. The above data is by way of example. In the case of a sendust film using the iron film of group C as an underlayer in general, the coercive force is decreased to 80% or less of the conventional case, and the magnetic permeability is 1.4 times or more the conventional case.

What we should pay attention to next is an improvement in frequency characteristics. In the case of a conventional sendust film having the (220) plane orientation, for example, the magnetic permeability is improved in a low-frequency region. However, it is hardly improved in a high-frequency region due to an eddy-current loss or the like. On the contrary, in the case of a sendust film according to the present invention, the magnetic permeability characteristics are significantly improved even in a high-frequency region, as is clear from FIG. 8. This effect is clearly brought about by using an iron film containing N chemically not combined with Fe as an underlayer.

It should be noted that the iron film including N chemically not combined with Fe corresponds to region C shown in FIGS. 3 and 4. Therefore, the deposition rate and the substrate temperature in depositing the iron film desirably satisfy the following relation (1):

$$(T-200)<V<(-1.6T+500) \qquad (1)$$

wherein T is a numerical value of substrate temperature (°C) and V is a numerical value of film deposition rate (nm/min).

Then, consider the structure of a sendust film formed by evaporation on an iron film deposited under the conditions of the relation (1).

Figure 9:
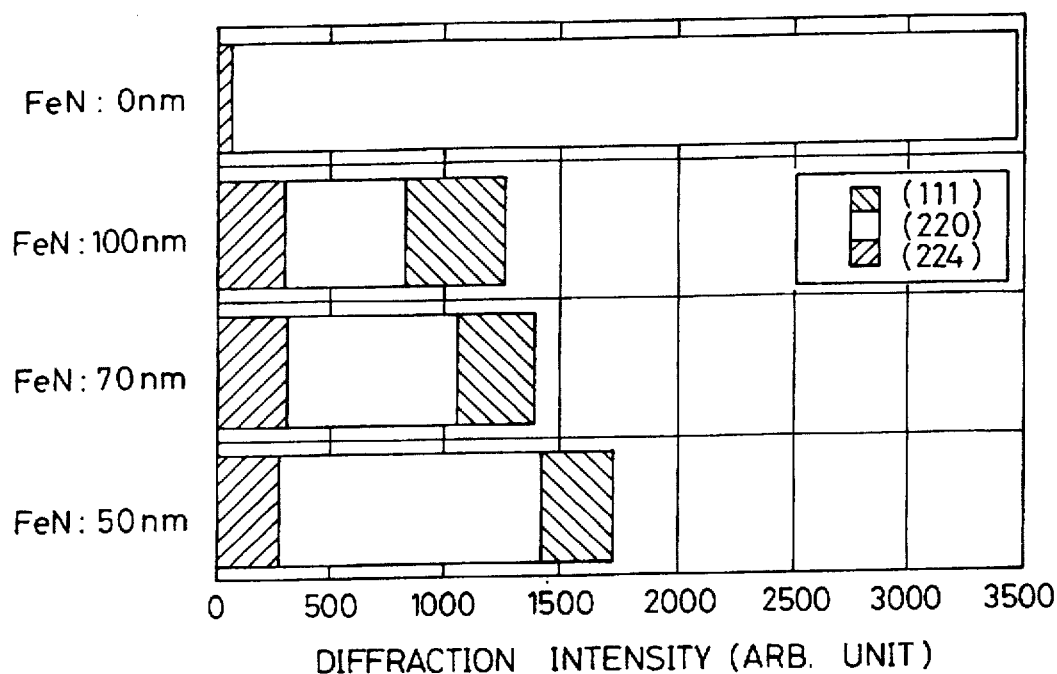
FIG. 9 is a graph showing the relationship between the thickness of the iron film underlayer and the X-ray diffraction intensity of the sendust film.

FIG. 9 shows diffraction intensities of various crystal planes in sendust films formed on various underlayers. In the graph of FIG. 9, the horizontal axis represents each of diffraction intensities of (111), (220) and (224) planes in arbitrary unit. Iron films including N chemically not combined with Fe (represented as FeN) are used as underlayers having thicknesses of 0 nm, 100 nm, 70 nm, and 50 nm.

Figure 10:
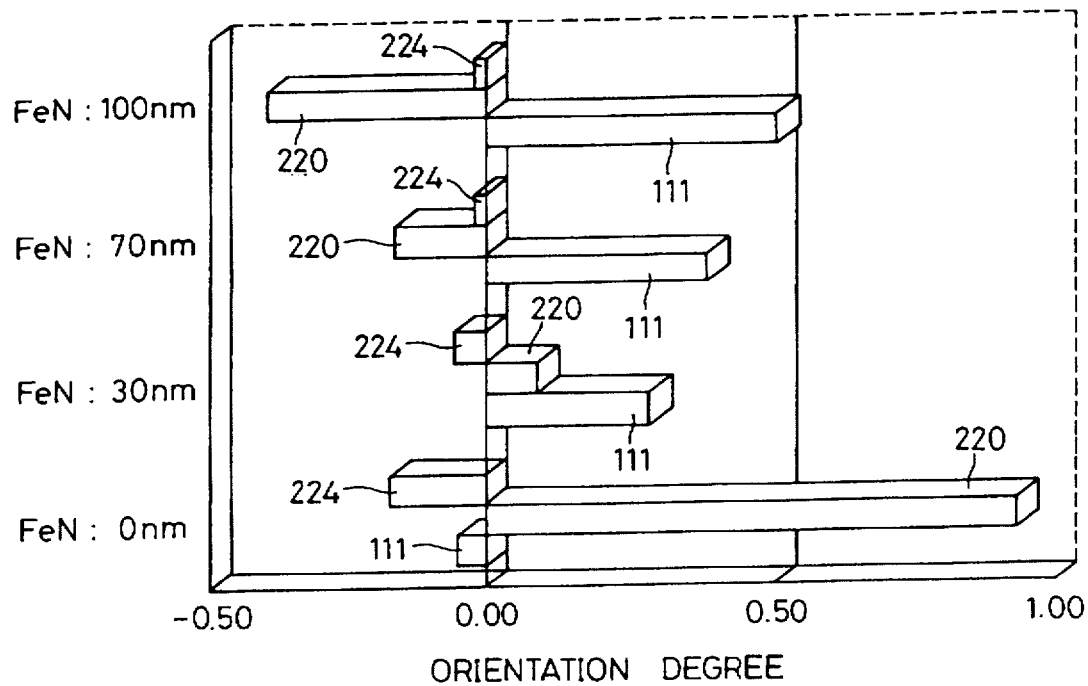
FIG. 10 is a graph showing the relationship between the thickness of the iron film underlayer and the degree of orientation of the sendust film.

FIG. 10 shows the relationship between thickness of an iron film (FeN) serving as an underlayer and the degree of orientation of a sendust film. In the graph of FIG. 10, the horizontal axis represents the degree of orientation, which is calculated according to the following expression (2) in a Lotgerling method.

$$OR=\{(I_{fp}+I_{ft})-(I_{bp}+I_{bt})\}\div\{(1-(I_{bp}+I_{bt})\} \quad (2)$$

wherein OR is degree of orientation, $I_{fp}$ is diffraction intensity of a certain specific plane in film, $I_{ft}$ is total diffraction intensity of film, $I_{bp}$ is diffraction intensity of the specific plane in bulk material, and $I_{bt}$ is total diffraction intensity of bulk material.

Since the diffraction intensity relating to the bulk material is measured using powder ground from the bulk material, a crystal plane in the bulk material has a random orientation.

As is clear from FIGS. 9 and 10, the thicker the underlayer is, the more the sendust film is changed in structure. As is seen from FIG. 9, the principal orientation of the sendust film is (220) without an underlayer, while that of the sendust film formed on the underlayer of the iron film belonging to group C is (111). This is more clear in FIG. 10. The degree of orientation changes depending on the thickness of the underlayer, and the (111) plane orientation is significant in the sendust film within a range of 30 to 100 nm in iron film thickness.

When the thickness of the iron underlayer is 100 nm or more, the iron film does not exhibit soft magnetic properties any more, and a BH loop curve tends to show two stages. More specifically, since the iron film underlayer exhibits magnetic properties, the sendust film having such an underlayer becomes unsuitable as a magnetic thin film for a magnetic head. Therefore, the thickness of the iron film underlayer is desirably 100 nm or less.

In brief, a sendust film formed on an underlayer of an iron film including N chemically not combined with Fe and belonging to group C shown in FIGS. 3 and 4 includes a large number of crystals of the (111) orientation, which improves frequency characteristics of the magnetic permeability in a range from a low-frequency region to a high-frequency region.

It has been considered in general that the greater the X-ray diffraction intensity of the (220) plane is, the more the magnetic properties are improved in the case of the sendust film. However, from another standpoint, the more significant the (220) plane orientation is, the more the columnar growth of the sendust film is accelerated, decreasing the density of the film in the vicinity of the interface with the substrate. This is well understood by SEM (Scanning Electron Microscopy) observation after slightly ion etching the section of the film, for example.

Figure 11A:
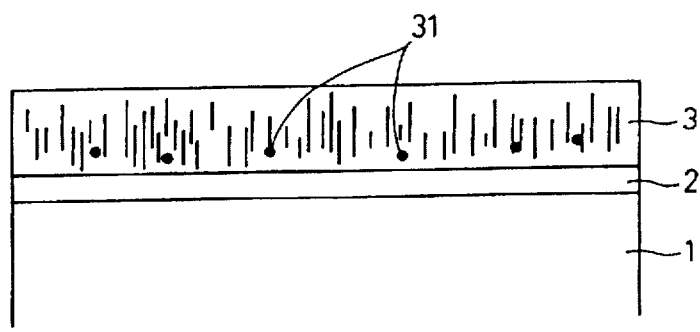
FIGS. 11A and 11B are views showing sectional structures of the magnetic thin film based on SEM observation.
Figure 11B:
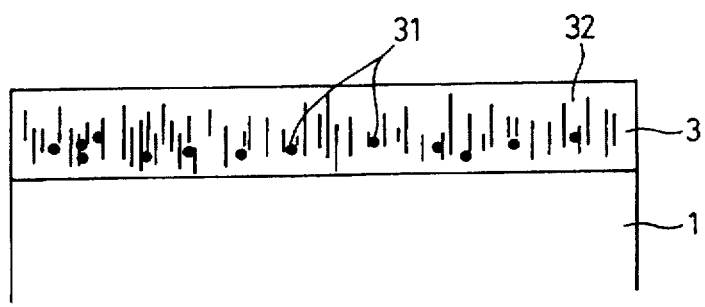

FIGS. 11A and 11B show SEM observation results of the sections of the sendust film formed on a substrate with underlayer and the sendust film formed on a substrate without underlayer, respectively. As indicated by vertical lines 32 in FIGS. 11A and 11B, sendust film 3 is generally observed to grow so as to have a columnar structure. Since a secondary electron image is observed by the SEM, secondary electrons are difficult to observe in low density regions 31 as if there were holes in these regions, as shown by dark regions 31 in the figures. This does not mean that there are actual holes in these regions. This simply means that the film density is extremely low in these regions.

A comparison between FIGS. 11A and 11B indicates that there are less low density regions 31 in the case of Fig. 11A including underlayer 2 than in the case of FIG. 11B not including underlayer 2. More specifically, not only the (111) plane orientation becomes significant, but also the quality of the sendust film changes at the initial film deposition stage in the case including the underlayer. The more significant the change of the film orientation is, the more the underlayer affects the film deposition. It follows that the film quality changes at the initial film deposition stage in particular. Although it is possible to consider that magnetic properties such as magnetic permeability are improved only by orientation change, it is natural to consider that this film quality change also has some influence on the improvement in magnetic properties.

With the underlayer according to the present invention, the sendust film is favorably changed at the initial nuclear growth stage, thereby decreasing low density regions 31. Further, the sendust film of the (111) plane orientation is also obtained depending on the forming condition of the iron film as an underlayer because of the influence by the nuclear growth. If the underlayer is used, even such a small influence as decreasing the diffraction intensity of the (220) plane of the sendust film contributes to an improvement in magnetic properties such as magnetic permeability in a high-frequency region in particular. However, it is known by simple calculation that the crystal magnetic anisotropy decreases so much as to change the order due to symmetry of a crystal, when the (111) plane orientation is implemented. However, the (111) plane orientation is never implemented in the conventional sendust film, and attention has been paid to implementation of the (220) plane orientation. In the present invention, by appropriately selecting the condition of iron film underlayer, the (111) plane orientation can be implemented, and the sendust film decreased in the crystal magnetic anisotropy is obtained.

In order to check whether or not the underlayer has any influence on stress relaxation, the inventors tried to use the iron film deposited in vacuum as an underlayer. However, neither improvement in magnetic permeability characteristics nor structural change of the sendust film was not obtained. Therefore, it is clear that even if the iron film according to the present invention brings about the effect of stress relaxation as an underlayer, it only relaxes the stress. The iron film does not improve magnetic properties of the sendust film.

Although formation of the sendust film was described in the above embodiment, the similar effect was confirmed in the case where an alloy type film having iron as a base metal such as an Fe—Si alloy film, for example, is formed on the iron film belonging to group C.

In the above embodiment, evaporation was used as a method of film deposition. However, the similar effect is obtained with other film deposition methods such as sputtering. Note that since the film deposition rate is as slow as approximately 100 nm/min or less in the case of sputtering, the productivity is lower in the case of sputtering than in the present invention, which implements a high film deposition rate of approximately 500 nm/min. The inventors have disclosed an attempt to control orientation of a magnetic thin film by changing a substrate temperature when evaporation is used as a film forming method in Japanese Patent Laying-Open No. 62-202307. According to this disclosure, a synergy effect is conceivably obtained that the magnetic anisotropy is decreased due to the (111) plane orientation by employing evaporation with which a high-quality film can be formed and by using the iron film underlayer which can affect the initial film deposition stage. Further, it is considered that magnetic properties in a region of negative magnetostriction can be improved.

An example of a magnetic head fabricated using the magnetic thin film according to the present invention will now be described. When such a magnetic thin film as described above is used for a magnetic head, surfaces crossing the stacking direction of multiple magnetic layers formed on a pair of substrates of magnetic material or non-magnetic material are butted against each other with a non-magnetic material thin film therebetween to form a magnetic gap. A composite head called MIG (Metal In Gap) is also put into practice which uses a metal material such as amorphous or sendust only in a portion in the vicinity of a gap surface and ferrite superior in wear resistance in the other portions. Note that a magnetic circuit can be configured only of a magnetic thin film.

Figure 12:
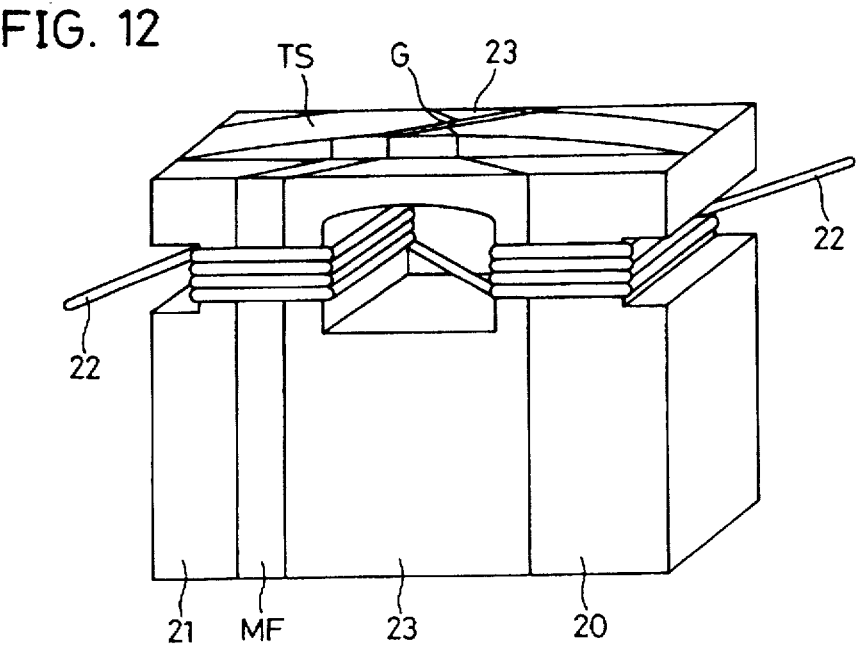
FIG. 12 is a perspective view showing one example of a magnetic head according to the present invention.

FIG. 12 is a perspective view of a magnetic head having a magnetic circuit configured of a magnetic thin film. Referring to FIG. 12, magnetic thin films MF according to the present invention are formed on the side surfaces of a pair of substrates 20 and 21. These substrates 20 and 21 are butted against each other. In order to form a gap G on a tape traveling surface TS, an extremely thin non-magnetic material is inserted between their butting surfaces. Glass 23 is usually filled on both sides of a track in the gap surface. When a tape (not shown) travels from right to left (or left to right) on tape traveling surface TS, a signal is input/output through a coil 22. Note that gap G is in a displaced right-angled relation to the track for azimuth recording in FIG. 12. If ferrite is used for substrates 20 and 21, the head of FIG. 12 is an MIG head.

In the case of such a head as shown in FIG. 12, the track width is substantially determined by the thickness of magnetic thin film MF. Therefore, selection between a structure including a plurality of triple layers as shown in FIG. 1 and one including only one such triple layer can be made taking the track width into consideration. With a sendust film of a composition in a region having a magnetic permeability of 4000 or more and negative magnetostriction as shown in FIG. 7B, the characteristics of the magnetic thin film for a monitor head were checked. As to reproducing output of this monitor head, it was confirmed that the effect of negative magnetostriction was obtained, the direction of the magnetic anisotropy was normalized, and the magnetic head was made high in performance, as described above.

In FIG. 12, an example of a magnetic head for VTR is shown. However, the present invention is not limited thereto. The present invention can be applied to various kinds of magnetic heads used at high frequency.

As described above, according to the present invention, an iron film including N chemically not combined with Fe is first formed on a substrate using plasma in nitrogen atmosphere, and then a sendust film having negative magnetostriction is formed on the iron film. Since the iron film underlayer and the sendust film formed thereon include iron as their common principal component, the nuclear growth of the sendust film is influenced by the iron film on which it is formed, leading to formation of a high-quality sendust film even at the initial deposition stage. Therefore, magnetic properties of the sendust film to be obtained, such as a magnetic permeability in particular, are improved in a range from a low-frequency region to a high-frequency region. It follows that a magnetic head using this sendust film as a magnetic thin film configuring a magnetic head has improved reproducing output.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetic thin film for a magnetic head, comprising:
   an iron film layer formed on a substrate and including N chemically not combined with Fe; and
   a sendust film layer formed on said iron film layer and having a (111) plane orientation parallel to said sendust film layer.

2. The magnetic thin film for a magnetic head according to claim 1, wherein
   said iron film layer has a resistivity of 50 to 300 µΩ·cm.

3. The magnetic thin film for a magnetic head according to claim 1, wherein
   said iron film layer has a crystal grain size of less than 20 nm.

4. The magnetic thin film for a magnetic head according to claim 1, wherein
   said iron film layer has a thickness of 30 to 100 nm.

5. The magnetic thin film for a magnetic head according to claim 1, comprising
   a triple layer formed of said iron film layer, said sendust film layer, and a protection film layer formed on said sendust film layer.

6. The magnetic thin film for a magnetic head according to claim 5, comprising
   a plurality of said triple layers.

7. The magnetic thin film for a magnetic head according to claim 1, wherein
   said sendust film layer has a negative magnetostriction.

8. A magnetic head having a magnetic circuit formed only of a magnetic thin film, said magnetic thin film comprising;
   an iron film layer formed on a substrate and including N chemically not combined with Fe; and
   a sendust film layer formed on said iron film layer and having a (111) plane orientation.

9. A method of manufacturing a magnetic thin film for a magnetic head, comprising the steps of:
   forming an iron film layer including N chemically not combined with Fe on a substrate using plasma in nitrogen atmosphere in a film formation apparatus; and
   forming a sendust film layer having a (111) plane orientation on said iron film layer in vacuum in the same film deposition apparatus.

10. The method of manufacturing a magnetic thin film for a magnetic head according to claim 9, wherein
    said film deposition apparatus includes a vacuum evaporation apparatus.

11. The method of manufacturing a magnetic thin film for a magnetic head according to claim 9, wherein
    a deposition rate of said iron film layer in a thickness direction satisfies the following expression:

$$(T-200) < V < (-1.6T + 500)$$

wherein T denotes a numerical value of a substrate temperature (°C) and V denotes a numerical value of a film deposition rate (nm/min).

12. A magnetic thin film for a magnetic head, comprising:

an iron film layer formed on a substrate and including N chemically not combined with Fe; and a sendust film layer formed on said iron film layer and having a (111) plane orientation parallel to said sendust film layer, wherein said iron film layer has a resistivity of 50 to 300 µΩ·cm, a crystal grain size of less than 20 nm, and a thickness of 30 to 100 nm.

* * * * *